(12) United States Patent
Wu (10) Patent No.: US 8,164,799 B2
(45) Date of Patent: Apr. 24, 2012

(54) DIGITALLY PRINTED COLOR ANTI-COPY DOCUMENT IN ANY RESOLUTION AND PROCESSES AND PRODUCTS THEREFOR

(76) Inventor: Judy W. Wu, Markham (CA)

( * ) Notice: Subject to any disclaimer, the term of this patent is extended or adjusted under 35 U.S.C. 154(b) by 1008 days.

(21) Appl. No.: 11/968,614

(22) Filed: Jan. 2, 2008

(65) Prior Publication Data

US 2008/0165387 A1   Jul. 10, 2008

Related U.S. Application Data

(60) Provisional application No. 60/883,107, filed on Jan. 2, 2007.

(51) Int. Cl.
*H04N 1/405* (2006.01)

(52) U.S. Cl. .................................. 358/3.28; 358/468

(58) Field of Classification Search ................. 358/3.28, 358/1.9, 2.1, 468; 347/107
See application file for complete search history.

(56) References Cited

U.S. PATENT DOCUMENTS

| | | | |
|---|---|---|---|
| 5,018,767 | A | 5/1991 | Wicker |
| 5,193,853 | A | 3/1993 | Wicker |
| 5,707,083 | A | 1/1998 | Wallace |
| 5,788,285 | A | 8/1998 | Wicker |
| 5,853,197 | A | 12/1998 | Mowry, Jr. et al. |
| 5,873,604 | A | 2/1999 | Phillips |
| 5,954,368 | A | 9/1999 | Mowry, Jr. et al. |
| 6,000,728 | A | 12/1999 | Mowry, Jr. et al. |
| 2002/0067828 | A1 | 6/2002 | Sparks et al. |
| 2003/0038974 | A1 | 2/2003 | Hu |
| 2006/0202468 | A1 | 9/2006 | Phillips |
| 2006/0284411 | A1 | 12/2006 | Wu |

*Primary Examiner* — Thomas D Lee
*Assistant Examiner* — Stephen M Brinich
(74) *Attorney, Agent, or Firm* — Grossman, Tucker, Perreault & Pfleger, PLLC (57) ABSTRACT

The present invention relates to a method and product resulting from the application of distortion security images in a digitally printed color anti-copy document, printed on demand, which may be variable use laser printers or printer/copiers and/or ink-jet printers and/or digital presses at any resolution.

14 Claims, 12 Drawing Sheets

DIGITALLY PRINTED COLOR ANTI-COPY DOCUMENT IN ANY RESOLUTION AND PROCESSES AND PRODUCTS THEREFOR

CROSS REFERENCE TO RELATED APPLICATIONS

The present application claims the benefit of the filing date of U.S. Provisional Application Ser. No. 60/883,107 filed Jan. 2, 2007, the teachings of which are incorporated herein by reference.

FIELD OF THE INVENTION

The present invention relates generally to a method and product resulting from the method for making color distortion security images in a digitally printed document, which may be printed on-demand and vary from document to document using digital output equipment such as laser printers or printer/copiers and/or ink-jet printers and/or digital presses at any resolution. The resulting digitally printed documents may include security features that may not be copied by color or black and white photocopiers. In addition, the documents may be produced as described herein, as well as alternative methods.

BACKGROUND

The advent of improved photocopy equipment, mainly high-resolution color photocopy equipment, has presented a real challenge to thwart the unauthorized duplication of original documents. The quality of the reproductions is often so good that, it may be difficult to distinguish original copies from color reproductions. Many methods, products and security features have been developed to prevent the unauthorized reproduction of original valuable documents, such as currency, traveler's checks, checks, coupons, gift certificates, licenses, passports, personal identification papers, as well as packaging material for brand protection to deter illegal activities such as counterfeiting. Generally these methods, products and security features may be formed by a pattern of dots, lines, screen structures or the like. Within the background pattern, additional information can be printed that is mostly hidden by the background pattern when viewed by a casual observer. The additional information typically includes a security warning such as the word "VOID" or "COPY". The security warning may become prominent on the copy such that even a casual observer will notice it. Thus, the original document may be easily distinguishable from its copied version by virtue of a warning such as "VOID" or "COPY" being prominently displayed on the copied version.

However, the described methods and products may be press printed documents. These documents may therefore be produced using standard press processes such as, but not limited, to offset printing (lithography), letterpress, flexographic, intaglio and gravure. The press processes may include generating film or plate, as in the case of CTP (computer to plate), at very high resolution usually at 2400 or 2540 dpi (dots per inch) to produce the pattern of dots, lines, screen structures or the likes that is required in the above described methods and products. During colorization the security feature may be assigned to one plate and/or one specific ink color, wherein the ink color may include ink of a defined PMS (Pantone Matching System) spot color or one or more of the colors in the 4-color process (Cyan, Magenta, Yellow, Black).

However, providing variable security using the above methods and processes, wherein the security features vary from document to document, each document being unique and not fixed, appears to be somewhat non-existence and cost prohibitive. It is also reportedly difficult for these technologies to be translated to lower resolution digital output devices, such as the case where the resolution of the output device maybe as low as 300 dpi (dots per inch), wherein the technologies may not remain effective against ever advancing reproduction equipment where the scanning resolution maybe as high 1200 dpi (dots per inch).

Therefore, what is needed is a document protection method and apparatus that enables a simple and expedient way to incorporate improved distortion security features, that may vary from document to document, printed on demand, printed at any resolution, printed using laser printers (including laser copier/printer) and/or ink-jet printers and/or direct image presses and/or digital presses such as but not limited to the HP Indigo, Kodak Nexpress, Versamark, Xeikon, and the Xerox IGen to prevent the unauthorized reproduction of original valuable documents through the use of photocopiers.

Moreover, what is needed are methods for producing such color original documents having such improved distortion security features calibrated, modified, transformed and/or customized for each digital output device such as laser printers and/or ink-jet printers and/or direct image presses and/or digital presses.

SUMMARY

An aspect of the present disclosure relates to a digitally printed color document at any resolution. The digitally printed color document may include a first printed portion comprising non-reactive colorized area and a second printed portion comprising reactive region of colorized shape elements, adjacent to the first printed area, wherein copiers and scanners reproduce the non-reactive digitally printed colorized areas differently than the reactive region of colorized shape elements.

A second aspect of the present disclosure relates to a storage medium having stored thereon a secure digitally produced electronic art file that when executed by a machine results in a color digitally printed document having a printed surface printed by digital print equipment. The color digitally printed document may include a non-reactive area, wherein the non-reactive area includes a colorized continuous tone with an assigned percentage of a specified color alone or in conjunction with colorized shape elements with an assigned percentage of a specified color, wherein the colorized shape elements are selected shapes from the group consisting of dots that are round, diamond, ellipse, square and/or cross, and the shape elements are placed randomly according to an algorithm in a stochastic process; and a second reactive area, wherein the second reactive area comprises colorized shape elements with an assigned percentage of a specified color, wherein the colorized shape elements are a selected shape from the group consisting of dots that are round, diamond, ellipse, square, cross, continuous lines, broken lines, dashes, and/or wavy lines, wherein the elements are defined in size and are placed at specific line angles, wherein the document is anti-copy to digital and analog copiers.

A third aspect of the present disclosure relates to a color digitally generated electronic distortion security feature for a document. The feature may include a pattern comprising a first printed portion of non-reactive colorized area, and a second printed portion comprising reactive region of colorized shape elements, adjacent to the first printed area, wherein the areas are at a predetermined relative percentage of a specified color, wherein the relative percentage of a specified color of the colorized non-reactive and reactive areas are configured to the specific output device, processed by the RIP (raster image processor) or printer driver, then printed by the digital printing equipment.

BRIEF DESCRIPTION OF THE DRAWINGS

The above-mentioned and other features and advantages of this invention, and the manner of attaining them, will become appreciated and be more readily understood by reference to the following detailed description of one embodiment of the invention in conjunction with the accompanying drawings, wherein:

FIG. 8 is a close up view of the isolated area of the rasterized electronic file of FIG. 5. 15 represents the RIP or printer driver of the digital output device when used to interpolate the reactive regions comprise of colorized elements with an assigned percentage of a specified assigned color and 18 represents the RIP or printer driver of the digital output device when used to interpolate the Cyan color channel of the reactive regions and 20 represents the RIP or printer driver of the digital output device when used to interpolate the Magenta color channel of the reactive regions. 16 represents the RIP or printer driver of the digital output device when used to interpolate the non-reactive regions comprise of a continuous tone at a faction (X %) of the assigned color, 17 represents the RIP or printer driver of the digital output device when used to interpolate the Cyan color channel of the non-reactive regions, 19 represents the RIP or printer driver of the digital output device when used to interpolate Magenta color channel of the non-reactive regions.

FIG. 9 is a close up view of the isolated area of the rasterized electronic file of FIG. 6. 15, 18 20 represents the RIP or printer driver of the digital output device when used to interpolate the reactive regions comprise of colorized elements with an assigned percentage of a specified assigned color as described in FIGS. 7, and 21 represents the RIP or printer driver of the digital output device when used to interpolate the non-reactive regions comprise of a continuous tone set at a faction (X-Y %) of the assigned color in conjunction with other colorized elements also with an assigned percentage (Z % where Z can be equal to or less then X) of the specified color, 22 represents the RIP or printer driver of the digital output device when used to interpolate the Cyan color channel of the non-reactive regions, 23 represents the RIP or printer driver of the digital output device when used to interpolate Magenta color channel of the non-reactive regions.

FIG. 10 is a close up view of the isolated area of the rasterized electronic file of FIG. 7. 15, 18 20 represents the RIP or printer driver of the digital output device when used to interpolate the reactive regions comprise of colorized elements with an assigned percentage of a specified assigned color as described in FIGS. 7, and 24 represents the RIP or printer driver of the digital output device when used to interpolate the non-reactive regions comprise of only colorized elements with an assigned percentage (Z % where Z can be equal to or less then X) of the specified color, 25 represents the RIP or printer driver of the digital output device when used to interpolate the Cyan color channel of the non-reactive regions, 26 represents the RIP or printer driver of the digital output device when used to interpolate Magenta color channel of the non-reactive regions.

Corresponding reference characters indicate corresponding parts throughout the several views. The example set out herein illustrates one preferred embodiment of the invention, in one form, and is not to be construed as limiting the scope of the invention.

DETAILED DESCRIPTION

Figure 1:
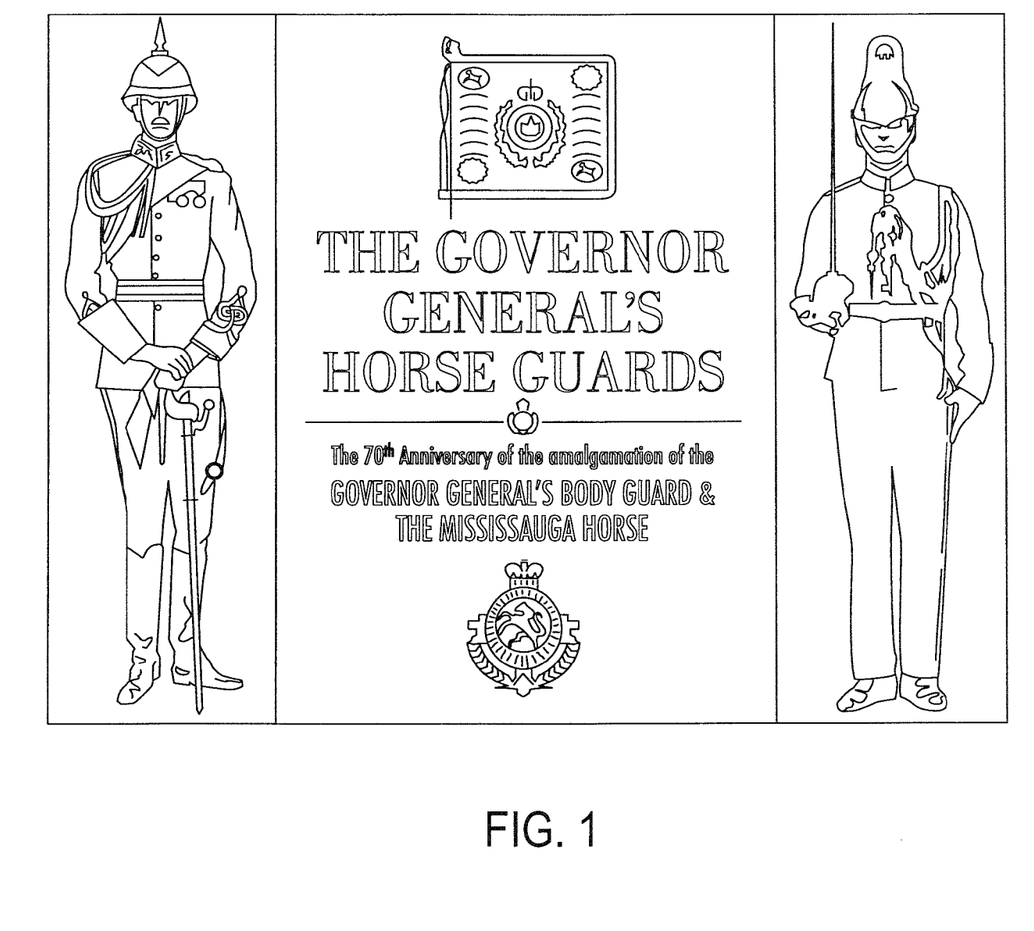
FIG. 1 shows one embodiment of an original document printed on Kodak Nexpress at a resolution of 600 dpi (dots per inch) incorporating an improved distortion color security feature in the form of a secure electronic art file of the present invention where the non-reactive and reaction regions are presented as a uniform tone to the eye.
Figure 2:
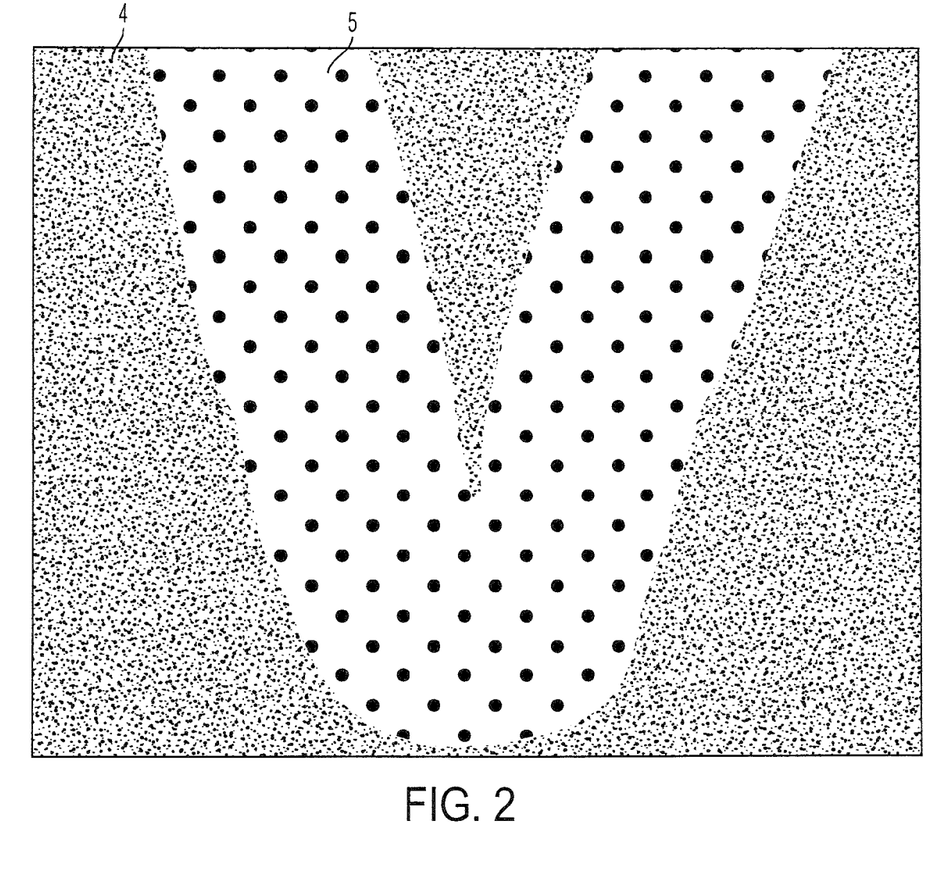
FIG. 2 illustrates a close up view of the non-reactive and the reactive zones printed by the Kodak Nexpress an original document FIG. 1 where the RIP or printer driver of the digital output device was used to interpolate 4, the non-reactive and 5, the reactive region of the secure electronic art file of the present invention where the printed non-reactive and reaction regions are presented as a uniform tone to the eye.
Figure 3A:
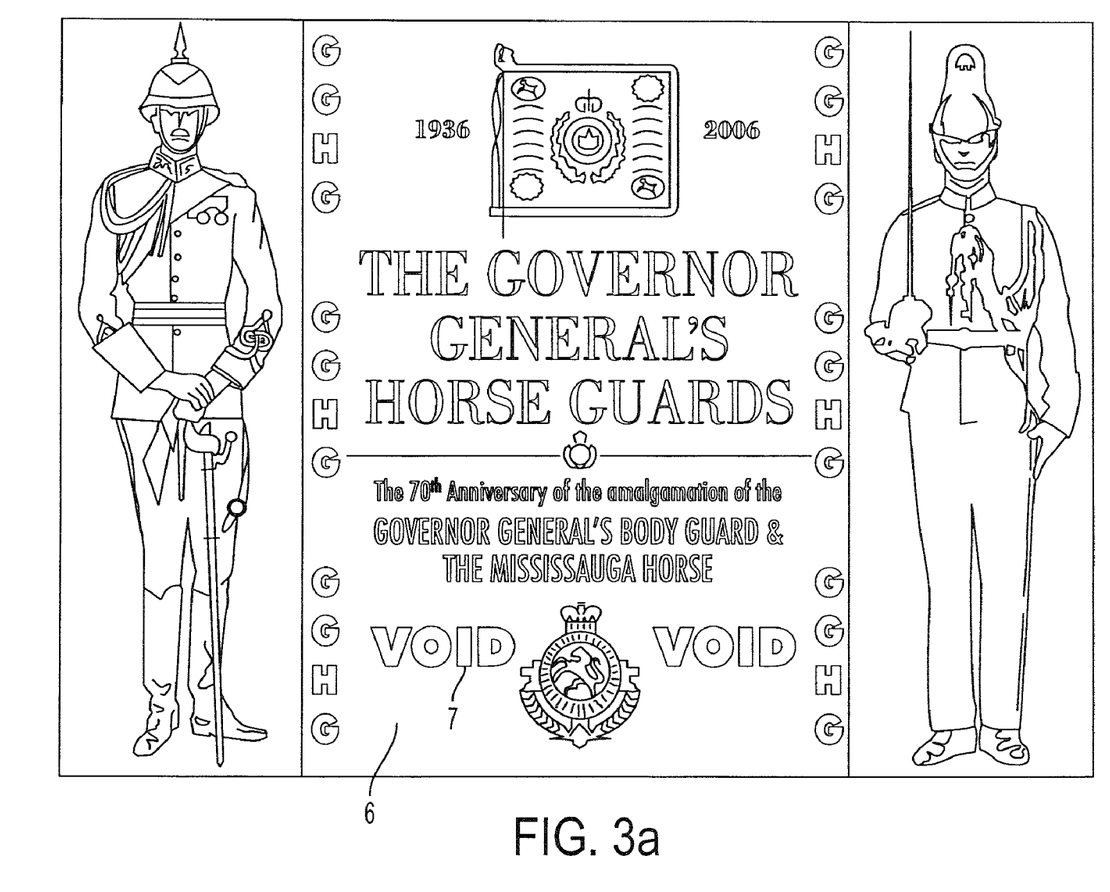
FIG. 3a illustrates the document of FIG. 1 after having been processed by a color photocopying machines, 6 represents the processed region of the non-reactive areas and 7 represents the processed region of the reactive arrears.
Figure 3B:
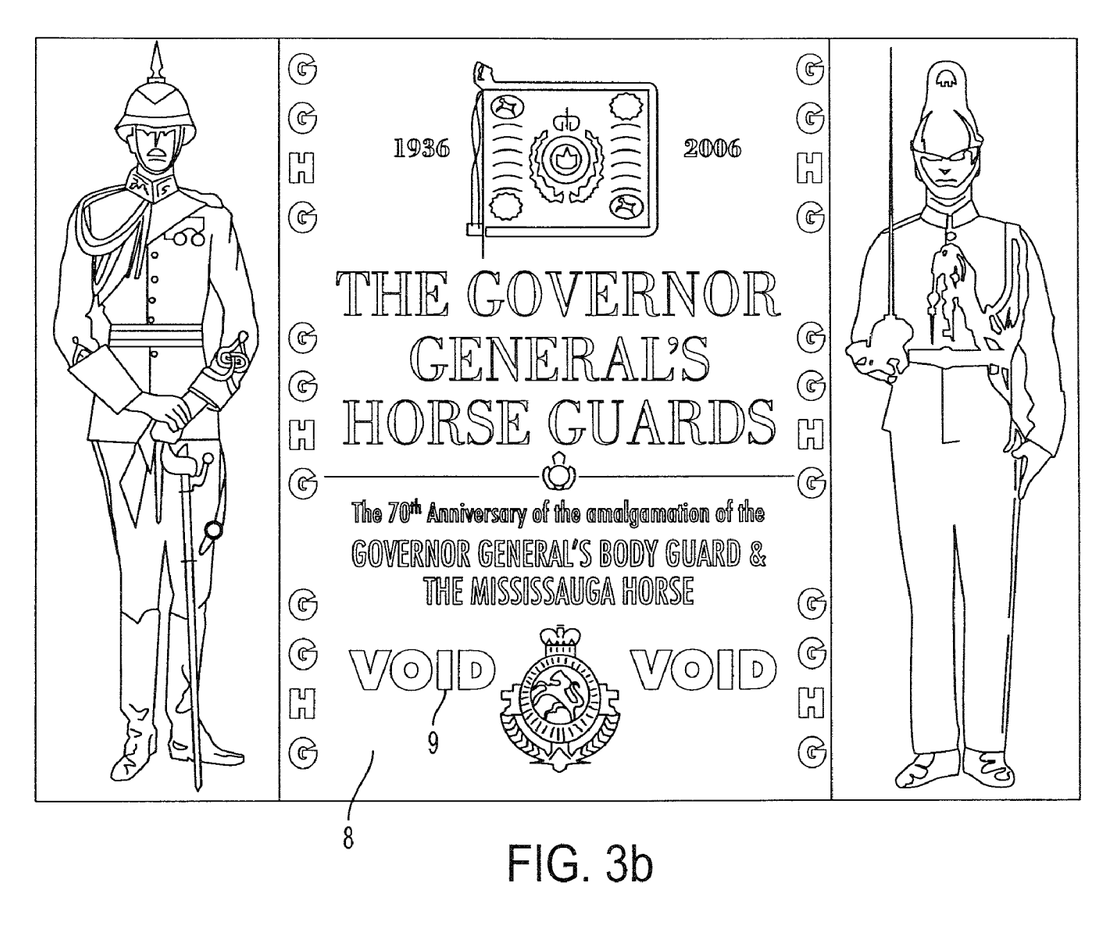
FIG. 3b illustrates the document of FIG. 1 after having been processed by a B&W photocopying machines, 8 represents the processed region of the non-reactive areas and 9 represents the processed region of the reactive arrears.
Figure 4A:
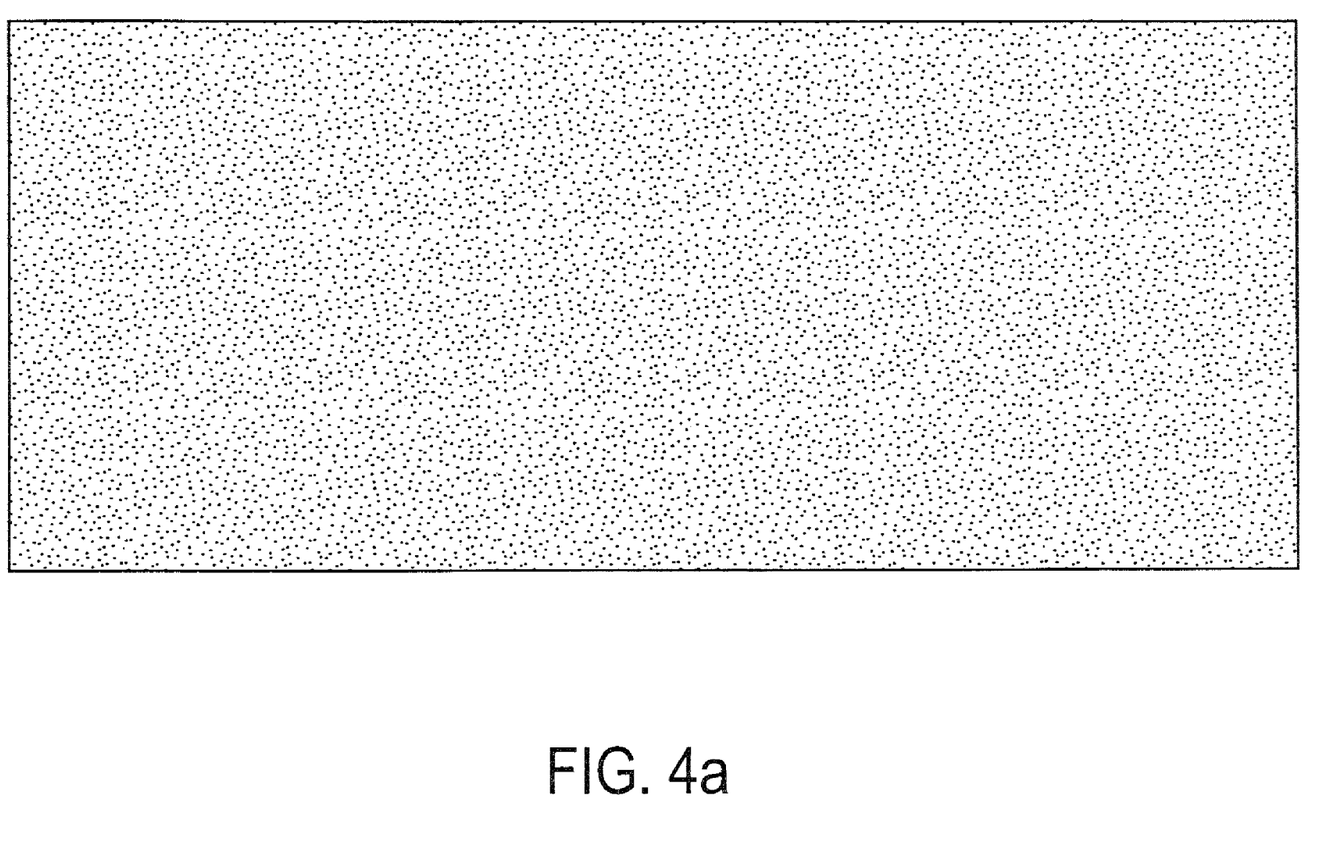
FIG. 4a is a plan view of an isolated area of an anti-copy electronic file yet to be printed by a digital printing equipment, constructed in accordance with one preferred embodiment of the present invention.
Figure 4B:
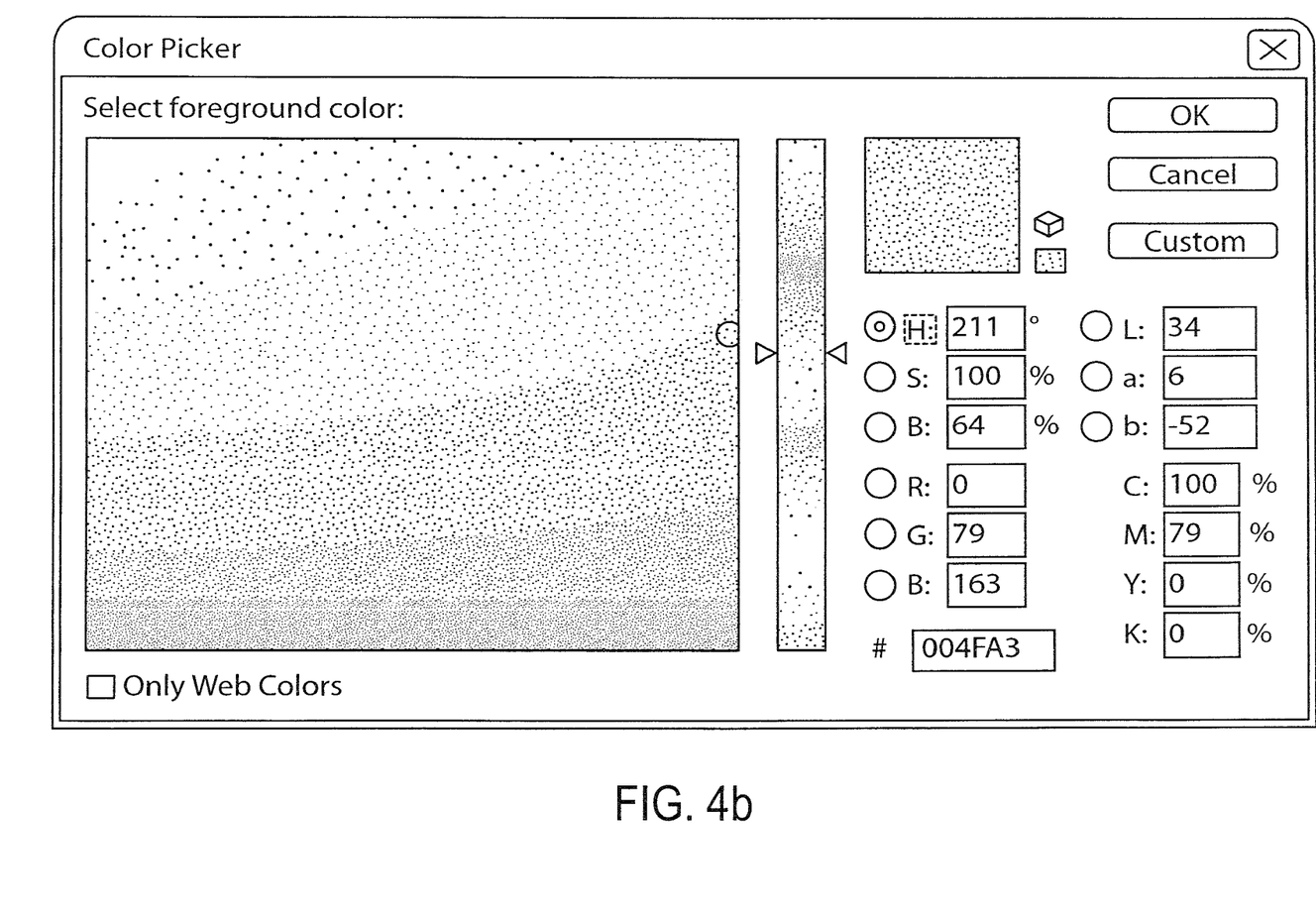
FIG. 4b is a representation of a PMS Blue as the assigned color of the anti-copy document, at one hundred (100%) percentage, in this example the 100% assigned color broken down as a 4-color process would be 100% Cyan, 79% Magenta, 0% Yellow and 0% Black.
Figure 5A:
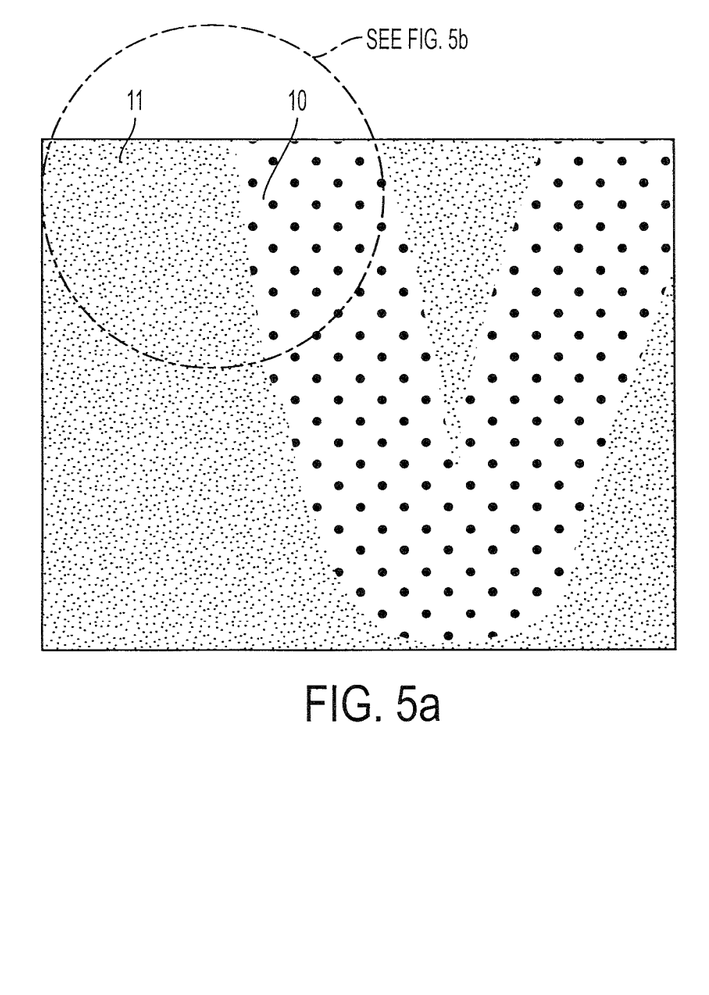
FIG. 5 is a version of a close up view of the isolated area of the electronic file of FIG. 1. 10 represents the reactive regions comprise of colorized elements with an assigned percentage of a specified assigned color, in this example the percent of the assigned color is 100%. 11 represent the non-reactive regions comprise of a continuous tone set at a faction (X %) of the assigned color where both reactive and non-reactive zones with colorized patterns of the electronic files is illustrated before it is printed.
Figure 5B:
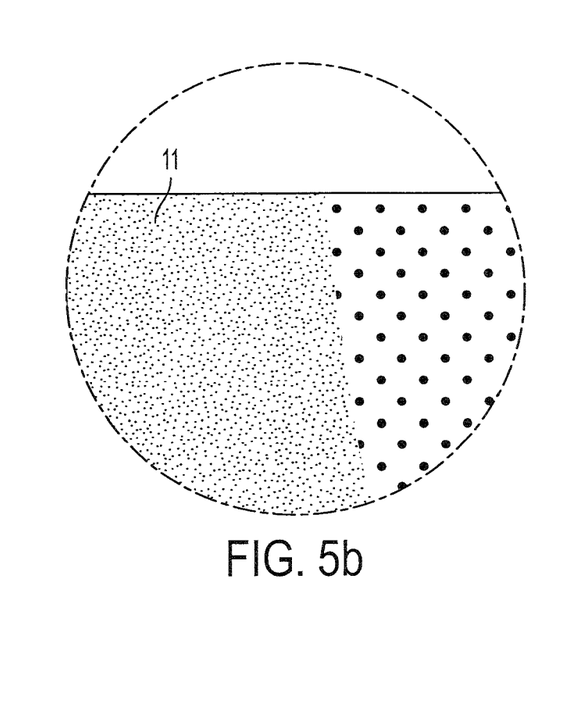
Figure 6A:
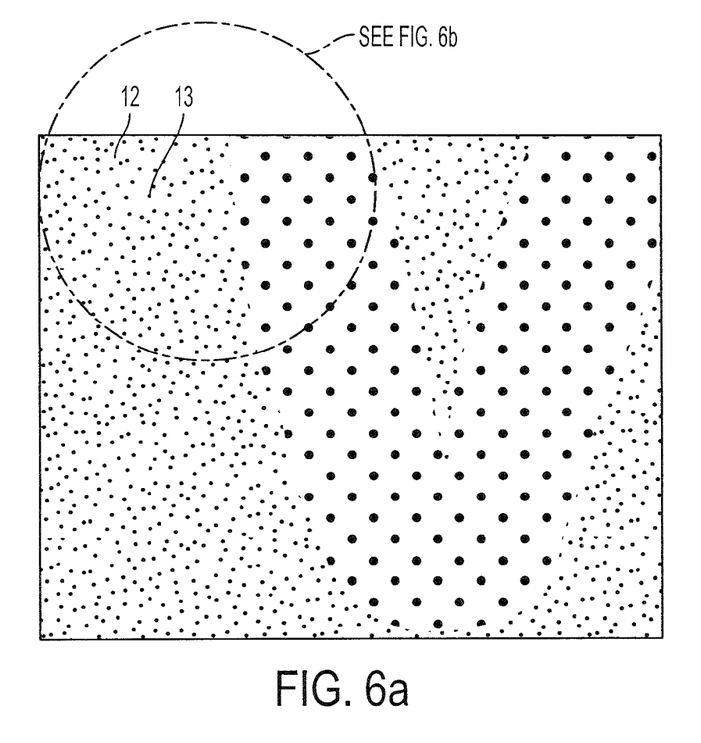
FIG. 6 is another version of a close up view of the isolated area of FIG. 1. 12 represent the non-reactive regions comprise of a continuous tone set at a faction (X-Y %) of the assigned color in conjunction with 13, other colorized elements also with an assigned percentage (Z % where Z can be equal to or less then X) of the specified color where the elements are randomly placed according to an algorithm in a stochastic print process where both reactive and non-reactive zones with colorized patterns of the electronic files is illustrated before it is printed.
Figure 6B:
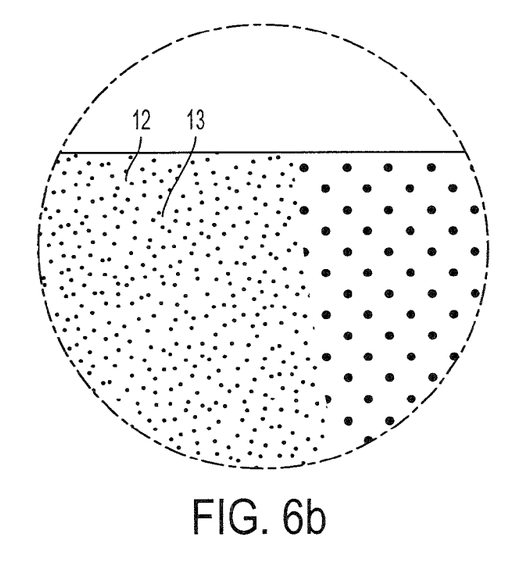
Figure 7:
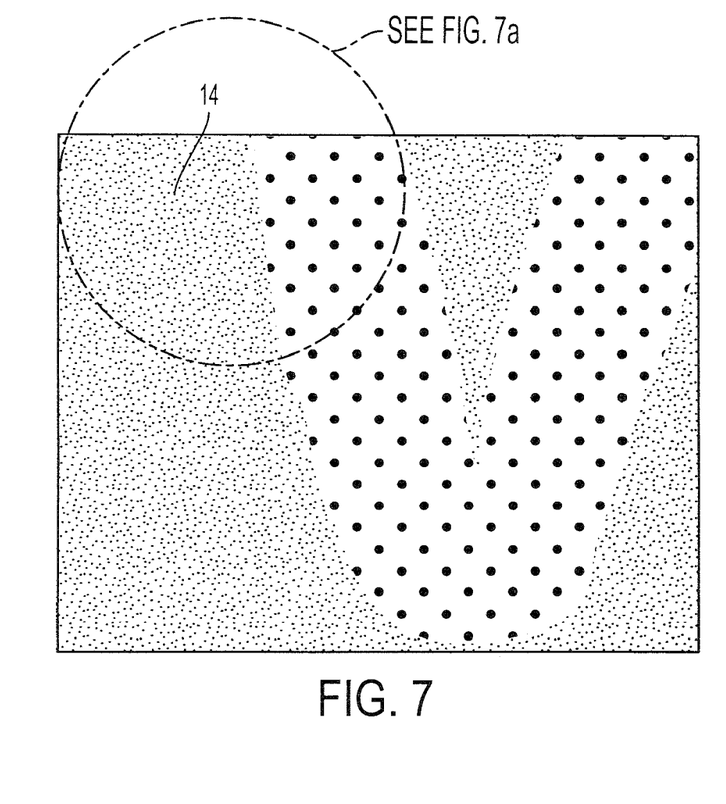
FIG. 7 is yet another version of a close up view of the isolated area of FIG. 1. 14 represent the non-reactive regions comprise of only colorized elements with an assigned percentage (Z % where Z can be equal to or less then X) of the specified color where the elements are randomly placed according to an algorithm in a stochastic print process where both reactive and non-reactive zones with colorized patterns of the electronic files is illustrated before it is printed.
Figure 7A:
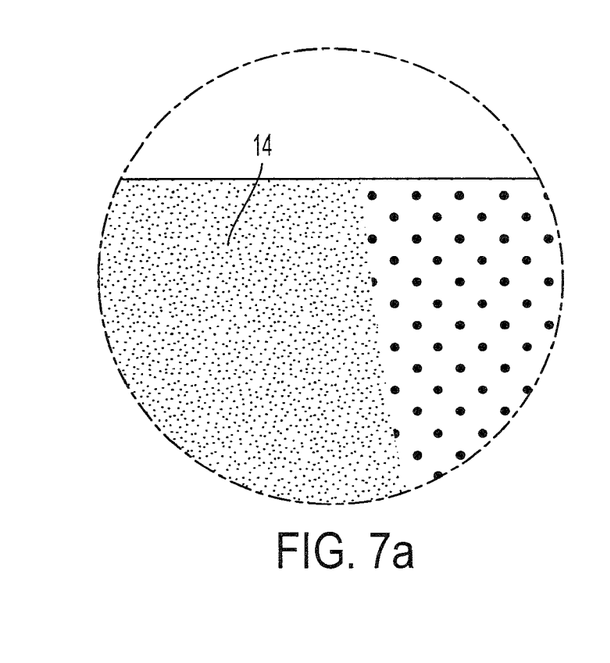
Figure 8:
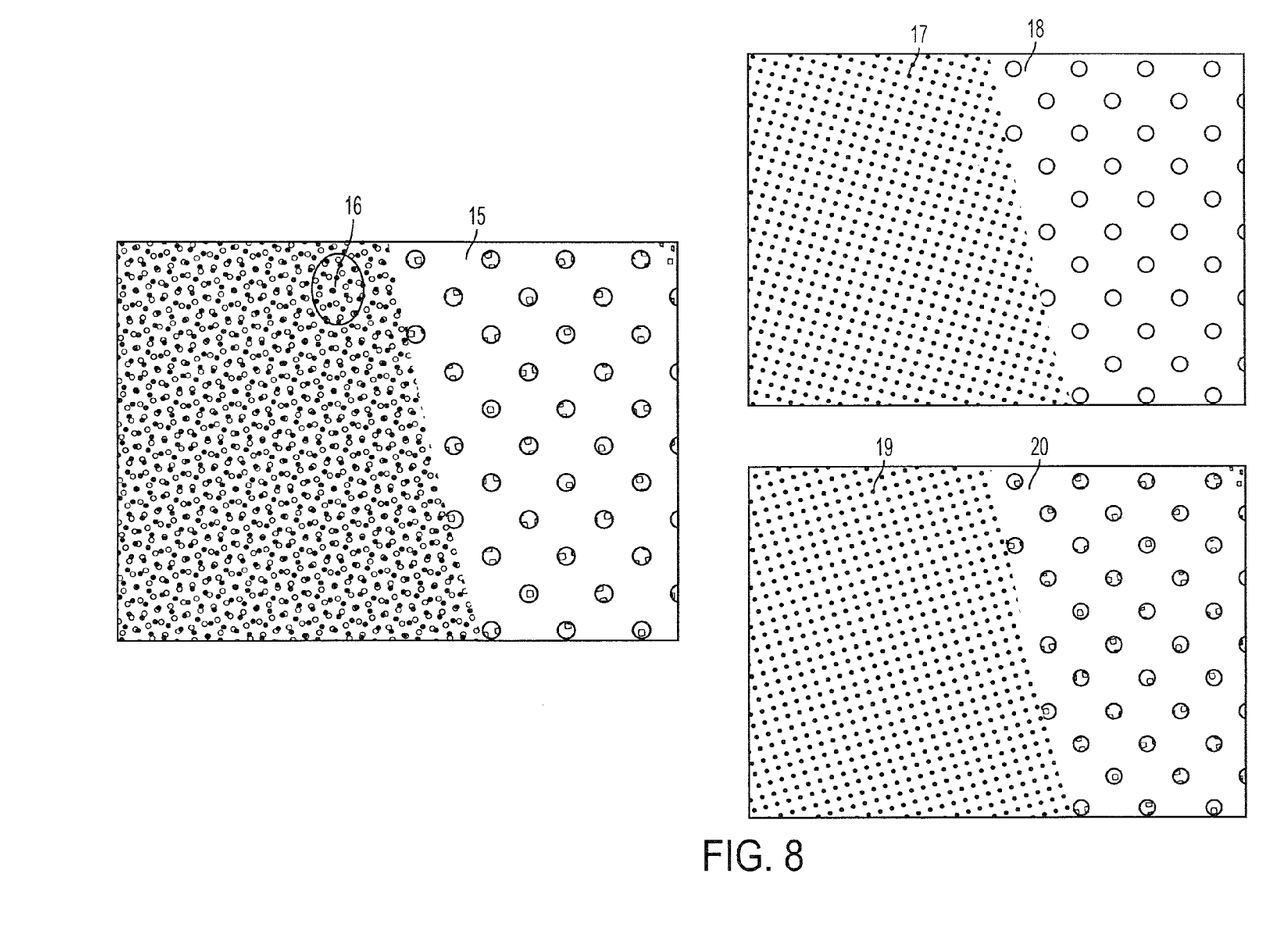
Figure 9:
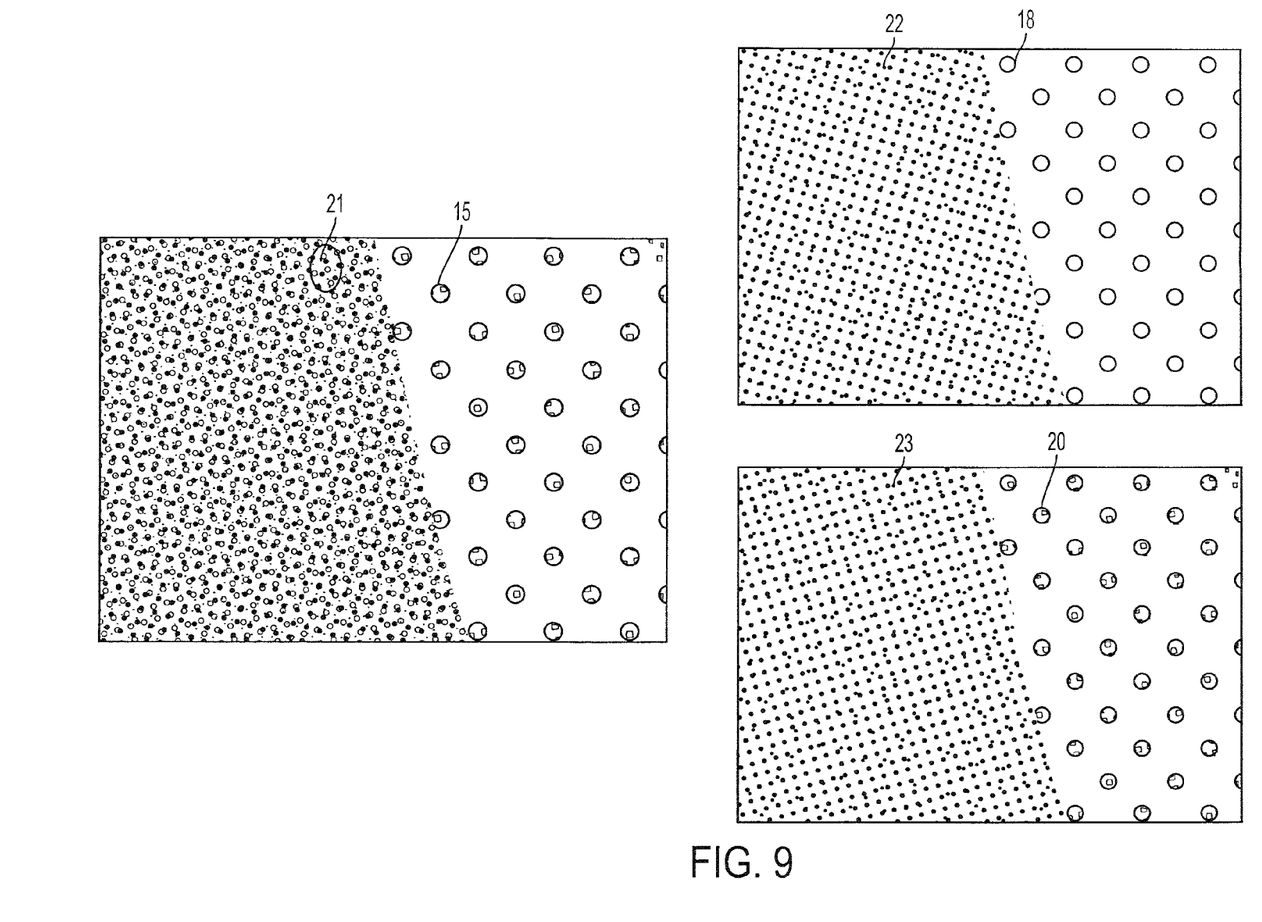
Figure 10:
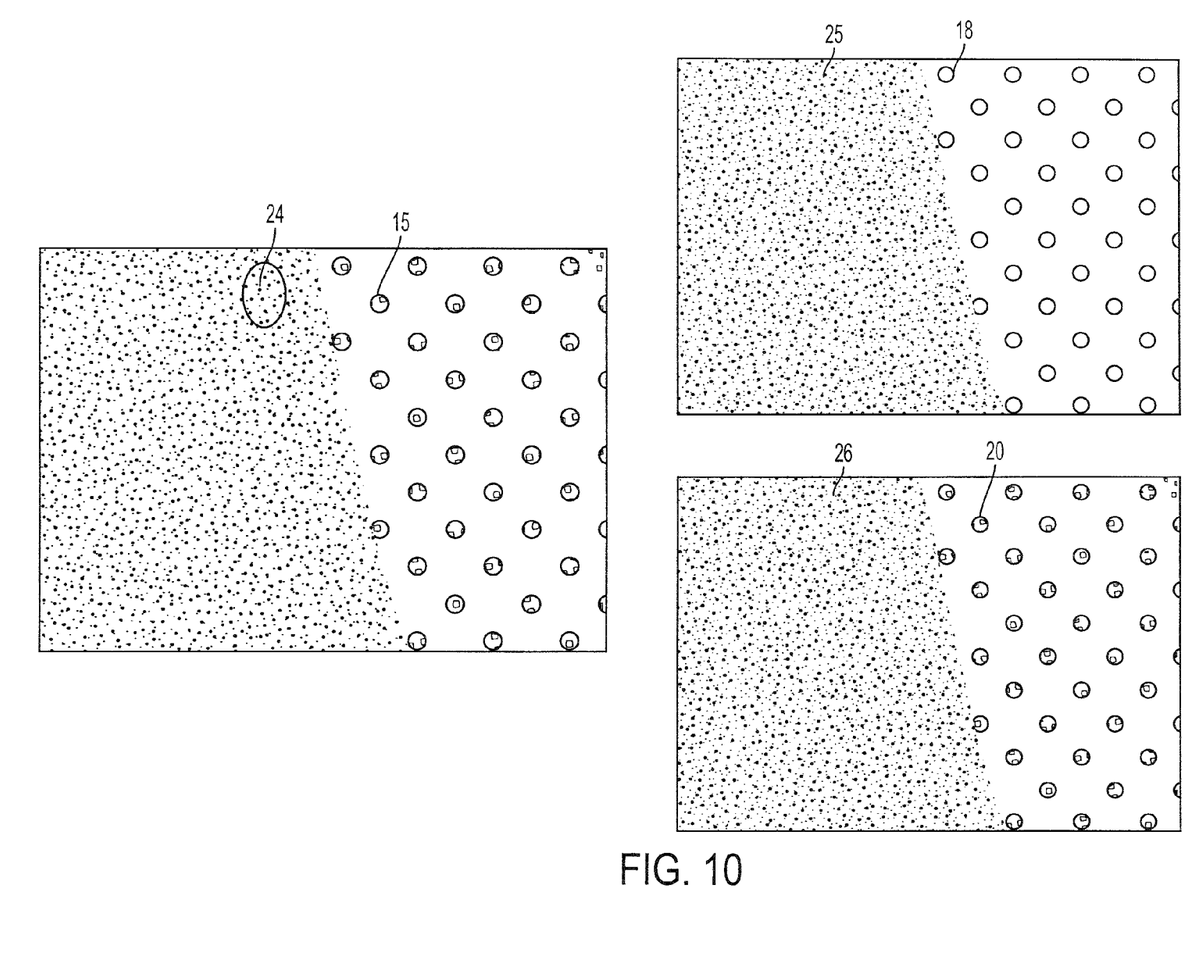

The present disclosure contemplates original documents that may be digitally printed on demand with an improved distortion anti-copy security features effective against color and/or black and white photocopiers and a method for digitally printing on demand original documents with color distortion security features, at any resolution from a digital printing device. Thus the documents may be printed using standard laser or ink-jet printers and/or direct image presses and/or digital presses embedded with a secure electronic art file that may be "anti-photocopy" to prevent unauthorized duplication and reproduction of originals by color and/or black and white copiers. In addition, the methods herein may be translated to standard press processes such as, but not limited to, offset printing (lithography), letterpress, flexographic, intaglio and gravure would yield a highly effective color anti-copy original document.

A RIP (raster image processor) may be used to process an image generated by a computer application to produce a desired image on a digital output device such as an imagesetter, standard press processes such as but not limiting to offset printing (lithography), letterpress, flexographic, and gravure, as well as most digital printers/copiers, digital presses and direct image presses. In the case of less expensive desktop digital output devices, such as low-end inkjets and laser printers, where one may not find a RIP, a printer driver may be used to communicate between the application and the desktop printing device.

The ripping process may convert digital information such as a PostScript file into a raster image. That is, the RIP may take the digital information about fonts and graphics that describes the appearance of the electronic file and translate it into an image composed of individual dots that the imaging device (such as the printer or imagesetter) can output. Ripping may also be printer/output device specific, in that the writing characteristics of the printer/output to be used may be taken into account in producing the ideal print image.

The present invention relates to a method and product for printing anti-copy documents, using any colored toner or ink based digital printing equipment such as laser printers, laser printer copiers, ink-jets printers, direct image presses and digital presses, by using the RIP (raster image processor) or printer driver, of the digital output device to interpolate the unique colorization techniques in the non-reactive colorized areas against adjacent to reactive areas with colorized shape elements. After processing, the resulting digitally printed color document may be copied by a photocopying machine, wherein the printed security features may be altered in the document from its original state to reveal the intended distorted feature in the copied state.

A digitally generated electronic file containing the distortion security feature may include unique patterns consisting of both non-reactive colorized areas and reactive regions with colorized shape elements within the same document. The colorized regions may be applied at predetermined relative percentages of a solid assigned color, and these colorization techniques may be modified, calibrated and/or customized to the specific digital printing equipment so that the resulting printed image containing the non-reactive and reaction regions may be presented as a uniform tone to the eye. After processing of the document by a photocopying machine, the electronic security features may alter the document from its original state to reveal the intended distorted security feature. The distortion security features may be printed on each unique and variable document on demand using standard laser or ink jet printers, or laser printer/copiers, or direct image presses or digital presses.

Both the reactive and non-reactive colorized regions of the document may be at a predetermined relative percentage of a solid assigned color. The assigned color may be an "accent color" to indicate colored toners or inks generally used by themselves to print their own color such as a Pantone Matching System (PMS) spot color while "process colors" such as Cyan, Magenta, Yellow and Black may generally be used in combination to create the impression of a color usually different from any of the original colors. Of course, process color toners or inks may be used as accent colored toners or inks. Furthermore, clear or colored toners or inks sensitive to ultraviolet or infrared lights and producing fluorescence when exposed to those conditions may also be used.

The digitally printed document may be printed using colored toner or ink based digital printing equipment. The document may have a portion of the printed area printed as a non-reactive colorized region and an adjacent printed area printed as a reactive colorized region in which the photocopiers will reproduce the non-reactive region differently then the reactive region. It may be understood therefore that the reproduction of the non-reactive region may therefore be visually detectable by a user as different than the visual reproduction of the reactive area, which reactive area may include a hidden image that is reproduced when copied and not readily visible on the original to the innate eye under normal viewing (i.e. without magnification and/or viewed at a distance of less than 18 inches from the eye).

The non-reactive region of the electronic document may include or consist of colorized continuous tone with an assigned percentage of a specified assigned color, with or without other colorized elements also with an assigned percentage of a specified assigned color, where the elements are selected from the group consisting of dots, varying in size and/or shape that may be round and/or diamond and/or ellipse and/or square and/or cross. The elements may be placed at specified and/or uniform line angles and/or line frequencies. In addition, the elements may be placed randomly according to an algorithm in a stochastic process in which the RIP or printer driver of the digital output device may be used to interpolate the unique colorization of the continuous tone and elements within the non-reactive colorized areas.

The reactive region of the same electronic document may include or consist of colorized reactive area including colorized elements with an assigned percentage of a specified assigned color where the elements are selected from the group consisting of dots that may be round, diamond, ellipse, square, cross, continuous lines, broken lines, dashes, or wavy lines. The elements may be placed at specified and/or uniform line angles and/or line frequencies. In addition, the elements may be placed randomly according to an algorithm in a stochastic process, in which the RIP or printer driver of the digital output device may be used to interpolate the unique colorization of the colorized elements within the reactive areas. The size of each colorized element may be fixed; however, the number of halftone elements may vary.

The digitally printed document may be produced using a digital electronic file in various file formats, such as but not limited to, .eps, .bmp, .tif, .gif, .jpeg or .pdf. The secure electronic art file may be set at the same resolution as the output digital print equipment. The secure electronic art file may also be set at a whole multiple, such as 2×, 4×, 8× etc. of the resolution of the output digital print equipment.

Other text and/or artwork files may be digitally printed directly on top of and/or beside the secure image at the same print time as the secure image art file or later after the secure image art file has already been printed onto a document. The secure image art file may be varied with each page within a digitally printed multiple page document. Furthermore, the secure image art file may be printed using colored toner or ink based digital print equipment in any color toner and/or ink that is available for that digital print equipment. The secure image art file may also be printed by a colored toner or ink based digital print equipment using color combination of toner and/or ink that is available for that digital print equipments The resolution of the digital printing devise may range from 300 dpi (dots per inch) and upward to the maximum resolution possible by advancing print equipment capabilities. Accordingly, copiers may reproduce the non-reactive region within the secure image art file substantially differently from reactive region with the colorized elements within the same secure image art file.

It may be appreciated that the present invention may be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed is:

1. A computer program product embodied on a non-transitory storage medium having stored thereon a secure digitally produced electronic art file that when executed by a machine results in the following:
    interpolating colorization techniques for a non-reactive area and/or a second reactive area of said digitally produced electronic art file using a raster image processer or a printer driver;
    printing a digitally colored printed document including said secure digitally produced electronic art file by digital print equipment, said secure digitally produced electronic art file including said non-reactive area, wherein said non-reactive area includes a colorized continuous tone with an assigned percentage of a specified color alone or in conjunction with colorized shape elements with an assigned percentage of a specified color, wherein said colorized shape elements are selected shapes from the group consisting of dots that are round, diamond, ellipse, square and/or cross, and said shape elements are placed randomly according to an algorithm in a stochastic process; and said second reactive area, wherein said second reactive area comprises colorized shape elements with an assigned percentage of a specified color, wherein said colorized shape elements are a selected shape from the group consisting of dots that are round, diamond, ellipse, square, cross, continuous lines, broken lines, dashes, and/or wavy lines, wherein said elements are defined in size and are placed at specific line angles,
    wherein said document is anti-copy to digital and analog copiers.

2. The computer program product embodied on the non-transitory storage medium of claim 1 wherein said secure electronic art file is in a vector based format.

3. The computer program product embodied on the non-transitory storage medium of claim 1 wherein said secure electronic art file is selected from one of the following file formats: .bmp, .tif, .gif, .jpeg, and .pdf.

4. The computer program product embodied on the non-transitory storage medium of claim 1 having stored thereon a second file, comprising text or artwork, that when executed by a machine results in digitally printing said text or artwork directly on top of and/or beside the secure art file at the same print time as the secure electronic art file.

5. The computer program product embodied on the non-transitory storage medium of claim 1 having stored thereon a second file, comprising text or artwork, that when executed by a machine results in digitally printed directly on top of and/or beside the secure electronic art file or later after the secure electronic art file has already been printed onto a document.

6. The computer program product embodied on the non-transitory storage medium of claim 1 wherein said document is a multiple page document and said secure electronic art file is variable with each page.

7. The computer program product embodied on the non-transitory storage medium of claim 1 wherein said secure electronic art file is printed by toner or ink based digital printing equipment using toner and/or ink in a selected color.

8. The computer program product embodied on the non-transitory storage medium of claim 1 wherein said secure electronic art file is printed by a toner or ink based digital printing equipment using toner and/or ink in a combination of colors.

9. The computer program product embodied on the non-transitory storage medium document of claim 1 wherein said resolution of said digital printing device at or greater than 300 dpi (dots per inch).

10. A method of providing a color digitally generated electronic distortion security feature for a document comprising:
    processing in a raster image processor (RIP) or print driver a non-reactive colorized area and a reactive region of colorized shape elements, wherein said RIP or print driver interpolates colorization of colorized elements within the non-reactive and/or reactive areas;
    printing an electronic security feature including a pattern comprising a first printed portion of said non-reactive colorized area and a second printed portion comprising said reactive region of colorized shape elements, adjacent to said first printed area, wherein the areas are at a predetermined relative percentage of a specified color,
    wherein said relative percentage of a specified color of the colorized non-reactive and reactive areas are configured to the specific output device.

11. The method of providing the color distortion security feature of claim 10 wherein said document is printed using a printer selected from laser printers, ink jet printers, laser printer/copiers, direct image presses, digital presses and combinations thereof.

12. The method of providing the color distortion security feature of claim 10 wherein said electronic security feature reveals the distortion security feature after processing of the document by a photocopying machine.

13. The method of providing the color distortion security feature of claim 10 wherein said electronic security feature is incorporated into a template for use with software programs comprising a program selected from the group of Microsoft Word, Microsoft Excel, Adobe PDF, Corel WordPerfect.

14. The method of providing the color distortion security feature of claim 10 wherein said document is a multiple page document and said secure electronic distortion security feature varies with each page of said multiple page document.

* * * * *